United States Patent [19]

Davis et al.

[11] 4,408,415
[45] Oct. 11, 1983

[54] CHRISTMAS TREE STAND

[76] Inventors: Billy R. Davis, 1486 Francis Ave., Upland, Calif. 91786; Bob G. Davis, 150 S. Beach Blvd., La Habra, Calif. 90631

[21] Appl. No.: 419,452

[22] Filed: Sep. 13, 1982

[51] Int. Cl.³ ............................................. A01G 29/00
[52] U.S. Cl. ..................................... 47/40.5; 47/48.5
[58] Field of Search ............... 47/40.5, 48.5; 411/439; 248/516, 519, 523

[56] References Cited

U.S. PATENT DOCUMENTS

| | | | |
|---|---|---|---|
| 868,568 | 10/1907 | Jones | 48/58 |
| 1,224,607 | 5/1917 | Craven | 411/439 |
| 2,997,264 | 8/1961 | Zelenitz | 40/40.5 |
| 3,779,493 | 12/1973 | Gidlof | 47/40.5 |

Primary Examiner—Robert A. Hafer
Assistant Examiner—Bradley M. Lewis
Attorney, Agent, or Firm—Edgar W. Averill, Jr.

[57] ABSTRACT

A Christmas tree stand which is readily adjustable to straighten a Christmas tree. A ball member which is affixed to the base of a tree is inserted into an opened clamp held by the stand. The tree is adjusted for straightness after which the clamp is locked about the ball member. The clamp may be closed by a foot pedal while the user holds and straightens the tree.

13 Claims, 3 Drawing Figures

CHRISTMAS TREE STAND

BACKGROUND OF THE DISCLOSURE

The field of the invention is Christmas tree stands and the invention relates more specifically to Christmas tree stands which permits the tree to be maintained in water.

A major difficulty with the use of Christmas tree stands is the problem associated with means for straightening the tree when it is affixed to the stand. The most common types of stands have a small nail which holds the bottom of the tree in a fixed position and then has three or more screw members which intersect the tree about one foot from the base and are used to align the tree. Unfortunately, this method is dependant upon the shape of the tree at the point where the screw members touch it. A different attempt is disclosed in U.S. Pat. No. 2,997,264. This patent discloses a device which holds a tree strictly from the base of the tree. However, it did not have provisions for maintaining the tree in water which, for fire safety reasons, is strongly advisable.

SUMMARY OF THE INVENTION

It is thus an object of the present invention to provide a Christmas tree stand which does not utilize the lower trunk of the tree for straightening and which has the ability to hold the tree immersed in water.

The present invention is for a readily adjustable Christmas tree stand which has a ball member having means for attachment to the base of a Christmas tree. A ball holding assembly having clamp means moveable between a first position and a second position holds the ball and attached tree in the desired position. When the clamp means is in its first position, the ball member may be moved readily to permit adjustment of the tree and when the clamp means is in its second position, the ball is held securely in the desired fixed position. Means are affixed to the clamp means to move the same from its first opened position to a second closed position. Preferably, the device is held within a water container and the clamp is operable from outside of the water container. A preferred means for holding the ball member to the base of the tree is a special spike which is partially driven into the base of the tree. That portion of the spike which extends below the base of the tree is inserted into a matching opening in the upper part of the ball member. A preferred clamp means is a pair of moveable jaws which are operated by a lever located outside of the water container.

BRIEF DESCRIPTION OF THE DRAWINGS

FIG. 4 is a cross-sectional view taken along line 4—4 of FIG. 1.

DESCRIPTION OF THE PREFERRED EMBODIMENTS

Figure 1:
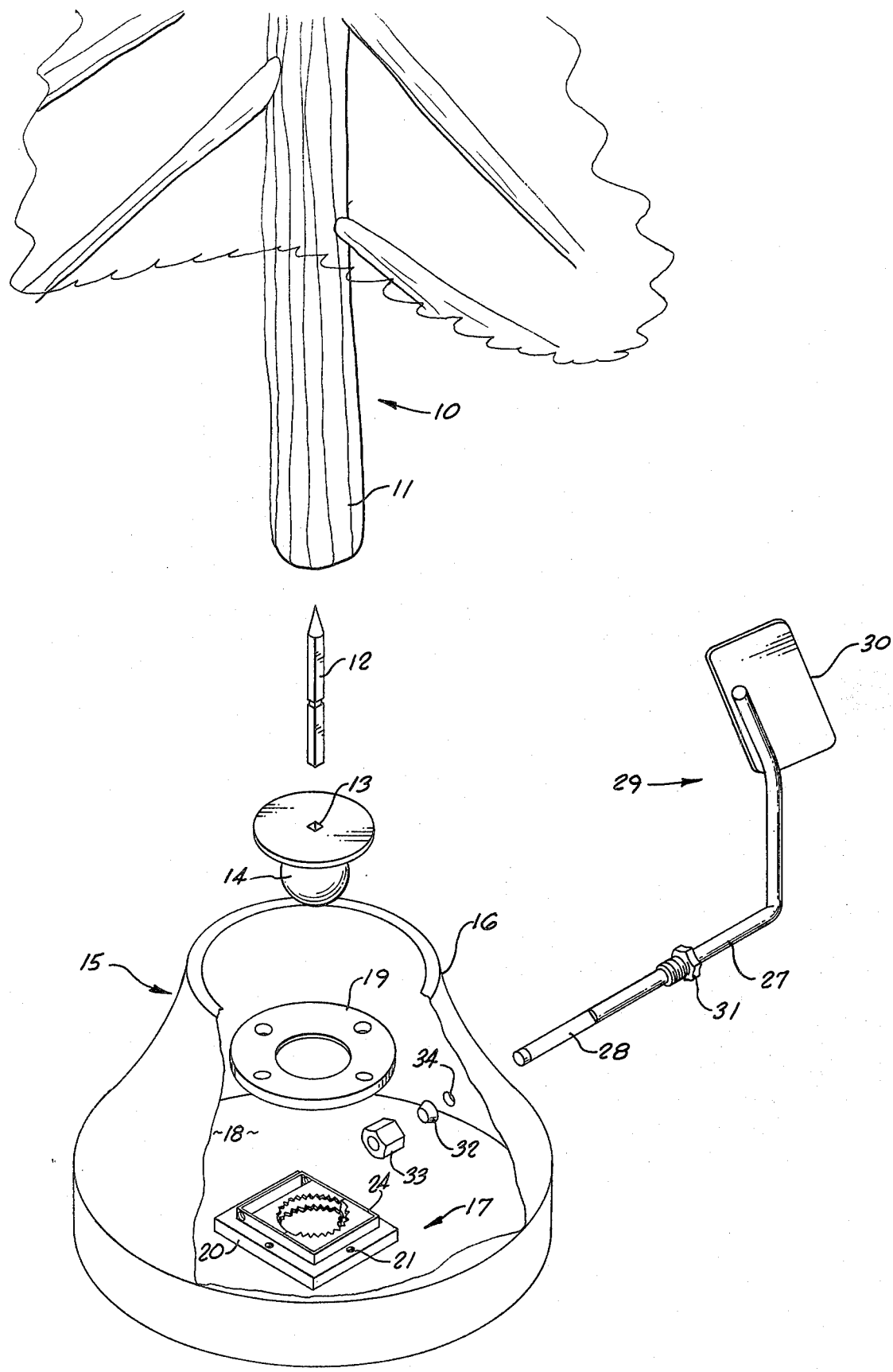
FIG. 1 is an exploded perspective view of the Christmas tree stand of the present invention.

Christmas tree 10 has a trunk 11 into which a spike 12 may be driven. Spike 12 is preferably non-circular so that when it is inserted into an opening 13 of ball member 14, the spike and ball member will move together. Preferably, the spike 12 is square and has a sharpened point to assist driving the same into the base of the tree. Spike 12 is driven approximately half way into the tree so that the lower end thereof extends below the base of trunk 11. The apparatus which holds ball member 14 in the desired position is held within a container 15 which may be plastic or metal. Ball member 14 may also be metal or plastic although a tough plastic such as high impact polystyrene or the like is preferred. Container 15 preferably has an upper shroud 16 which not only reduces water evaporation but also helps prevent objects from falling into the container 15. A clamp assembly generally indicated by reference character 17 is held to the base 18 by a clamp holding collar and guide plate 19. Plate 19 is held to the base of the shroud by four screws which are screwed into threaded holes 21 in ridge 20. Plate 19 not only holds the jaw assembly securely in place, but also helps guide ball member 18 into the center of the clamp assembly 17.

Figure 2:
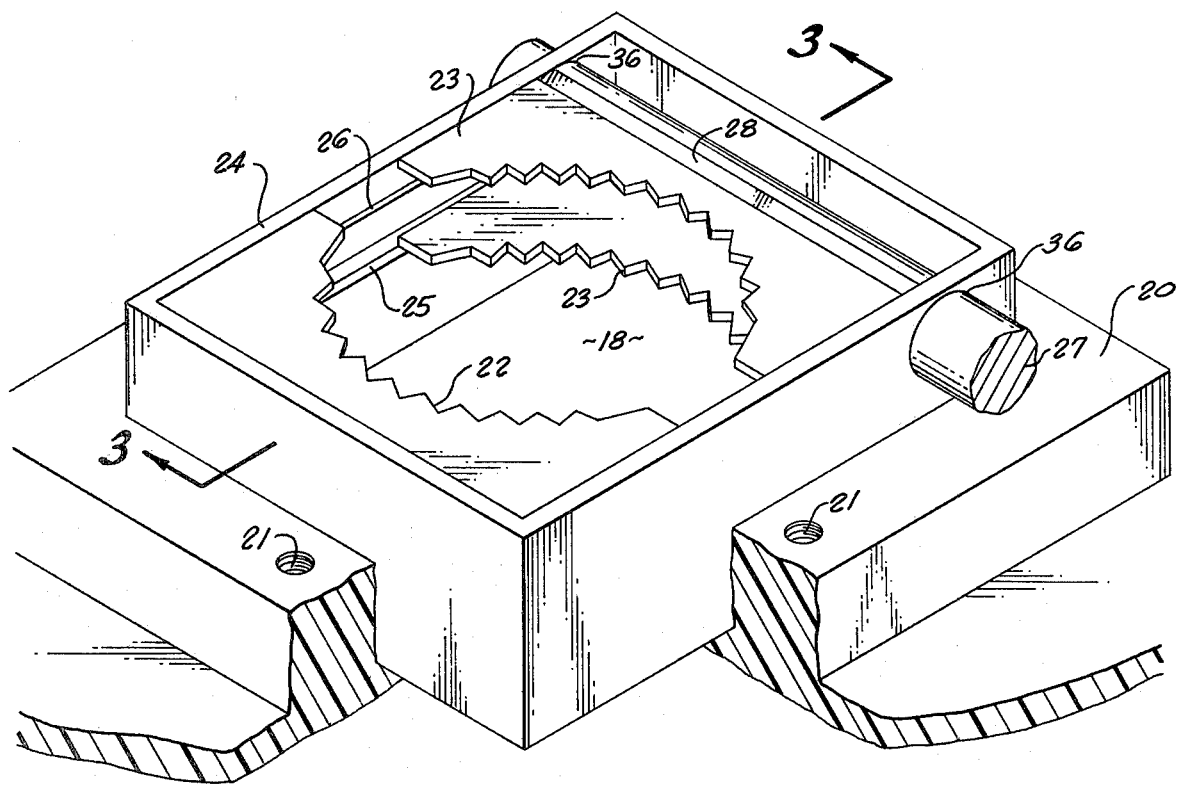
FIG. 2 is an enlarged perspective view of the clamp member of the Christmas tree stand of FIG. 1.
Figure 3:
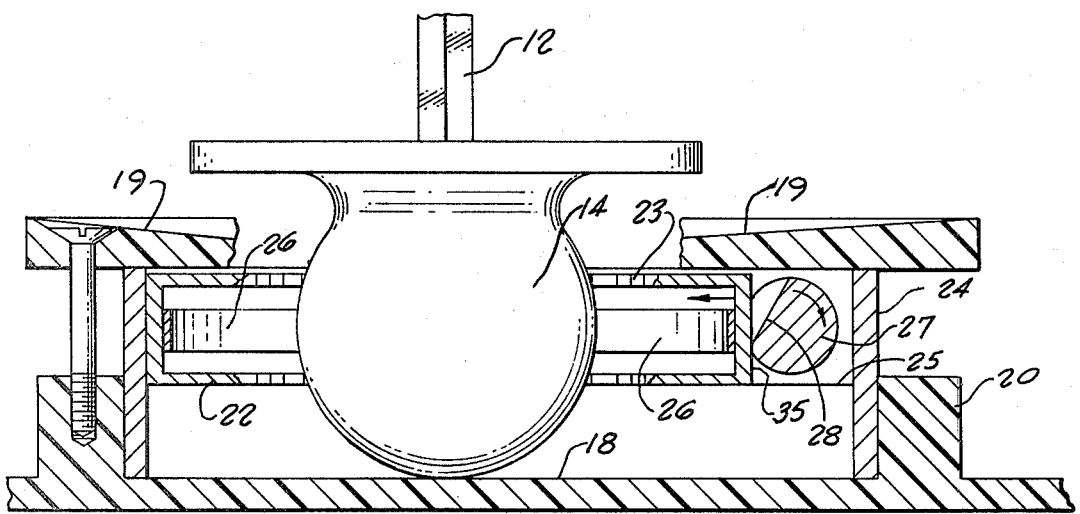
FIG. 3 is a cross-sectional view taken along line 3—3 of FIG. 2.

Turning now to FIG. 2 of the drawings where the clamp assembly is shown in perspective view, it can be seen that the clamp assembly has a pair of jaws 22 and 23, jaw 22 being a stationary jaw and jaw 23 being a moveable jaw. Jaws 22 and 23 are held within frame 24 which has a step 25 formed on the inner lower surface thereof to hold the jaw 23 and to permit it to move toward and away from jaw 22. Frame 24 is preferably formed from steel or other structurally strong material. It can be seen that step 25 holds the jaws 22 and 23 up and away from the surface of base 18 so that the jaws may grip ball member 14 in the middle thereof and hold it securely between them. Preferably, the jaws are held open by biasing means such as leaf spring 26. Leaf spring 26 is formed into a generally U-shaped bend and inserted into the middle of the generally U-shaped jaws to hold the same apart. Jaw 23 is moved by the turning of camshaft 27 which has a flat face 28. Camshaft 27 is also shown in FIG. 1 and is an integral part of foot lever assembly 29. Assembly 29 also has a foot pedal 30 and the assembly is held into an opening 34 in the side of shroud 16. Preferably, collar 31 is glued and sealed about opening 34 and is held in a water-tight manner to shaft 27 by washer 32 and nut 33. As thus can be seen best from FIG. 3, the pushing of pedal 30 will turn the camshaft and force jaw 23 against ball member 14. Ball member 14, of course, is also forced against jaw 22 and thus is securely held in place.

The operation of camshaft 27 is particularly advantageous in that it is impossible for the user to exert an excess of pressure against ball member 14 because, at maximum deflection, the circular part of camshaft 27 mates with the flat surface 35 of jaw 23. Camshaft 27, of course, is held by a pair of holes 36 in the side of frame 24.

While the jaws are shown being urged openly by a spring, it is equally possible to construct the device so that a spring holds the jaws in a closed configuration and a cam member opens them. Thus, if such a configuration were used, the ball member would be inserted when the lever was pressed down to open the jaws and the lever would be loosened to close the jaw against ball member 14.

It can be seen that the operation of the device of the present invention is particularly easy as compared to Christmas tree stands of the prior art. After spike 12 has been driven into the bottom of the tree and ball member 14 inserted over the protruding end thereof, the assembly is simply lowered into the stand and the tree is turned and tilted to the desired position and then pedal 30 is depressed clamping jaws 22 and 23 against ball member 14 securely holding it and the tree in the desired place. If for any reason the positioning is not ideal, the pedal may merely be lifted and the ball moved to the new desired position. At the end of the Christmas season, the tree is merely lifted out after lifting foot pedal 30 and the ball member 14 is saved. Although it is possible to remove the spike from the bottom of the tree, additional spikes may be readily provided for additional years. It can further be readily seen that the stand of the present invention may hold the base of the tree under water merely by filling the water-tight shroud to the desired location.

Although spike 14 could be circular, it is advantageous that it be non-circular so that the tree would be held in a fixed position and not permitted to turn about its trunk. A preferred configuration is a square spike. It is advantateous to include a mark or other indicia at the point where the spike should be driven into the tree. In that way the user is guided in driving the spike a correct distance. This may be done either with paint or cutting a groove or other marking means.

While a saw tooth jaw is shown in the drawings, other jaw configurations may, of course, be used and other clamping means in general may be used. It is only important that the clamp be capable of securely holding ball member 14 against turning or twisting. Various clam shell or other tighteneing methods may also be employed in place of the jaws shown in the drawing. It should be pointed out, that it is particularly advantageous that the tightening means be positioned outside of shroud 16 of ease in use. If it were necessary to reach inside shroud 16, the ease of use of the present device would be substantially lessened. It should be noted that with the present configuration, the tree may straightened quite accurately by a single person whereas if one had to reach inside the shroud it would be impractical to observe the position of the tree while straightening it. Other clamping means are contemplated by the present invention, however, and a hand tightening shaft or shafts or the like would also suffice although the foot pedal is preferred. It is also contemplated that various clamping means would be involved which would use more than two jaws and it is further contemplated that more than one jaw may be moveable. Once again, it is only important that the clamping means hold the ball in a secure configuration and be readily controlled from a position away from the point of clamping.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A Christmas tree stand which is readily adjustable to straighten the Christmas tree, said stand comprising:
   a ball member having means for attachment to the base of a Christmas tree;
   a ball holding assembly having clamp means moveable between a first position and a second position, said first position being such that the ball member may move readily about in said clamp means and said second position being such that said ball member is held securely therein in a fixed position;
   remote control means affixed to said clamp means to move the same from said first position to said second position said remote control means being operable by a shaft; and
   a water container surrounding said ball holding assembly and extending sufficiently upwardly to hold water above the uppermost portion of said ball member when said ball member is held in said clamp means and wherein the shaft of the remote control means extends through the side of said water container.

2. The stand of claim 1 wherein said means for securing said ball member to a tree comprises a spike means.

3. The stand of claim 2 wherein said spike means has a non-cylindrical shaft.

4. The stand of claim 3 wherein said spike means is rectangular.

5. The stand of claim 4 wherein said spike means is square with a point formed at one end and a drive surface at the other end.

6. The stand of claim 3 wherin said spike means is held into said ball member by an opening which is the same size as the shaft of said spike means.

7. The stand of claim 1 wherein said jaw means comprises a pair of jaws, each jaw having a pair of ball member intersecting surfaces.

8. The stand of claim 7 wherein said intersecting surfaces have a saw tooth configuration.

9. The stand of claim 8 wherein one of said pair of jaws is moveable and the other of said jaws is immoveable.

10. The stand of claim 9 wherein the moveable jaw has biasing means urging said moveable jaw away from said jaw which is immoveable.

11. The stand of claim 10 wherein said moveable jaw is moved by a cam.

12. The stand of claim 11 wherein said cam has a cylindrical part which intersects the moveable jaw when the moveable jaw is in its closed configuration whereby over tightening of the jaws is prevented.

13. The stand of claim 11 wherein said cam is on a shaft which is turned by depressing a foot pedal.

* * * * *